United States Patent Office 3,481,975
Patented Dec. 2, 1969

3,481,975
METHOD OF PREPARING DICARBOXYLIC ACIDS
David Moiseevich Rudkovsky and Naum Solomonovich Imjanitov, Leningrad, U.S.S.R., assignors to Vsesojuzny Nauchno, Issledovateljsky Institute Neftekhimicheskikh Protsessov, U.S.S.R.
No Drawing. Filed Aug. 11, 1965, Ser. No. 478,995
The portion of the term of the patent subsequent to Aug. 19, 1986, has been disclaimed
Int. Cl. C07c 51/14
U.S. Cl. 260—533          7 Claims The present invention relates to methods of preparing dicarboxylic acids.

A method of preparing higher dicarboxylic acids from diols and carbon monoxide in the presence of metal carbonyl compounds used as catalysts is known (W. G. Patent No. 948,151).

A method for the preparation of adipic acid from tetrahydrofuran, water and carbon monoxide is also known. A method of preparing adipic acid by the reactions—benzene→cyclohexane→adipic acid—has found wide application in industry. The final stage is carried out by the oxidation of cyclohexane with nitric acid or oxygen in the presence of manganese salts used as catalysts. Other higher dicarboxylic acids are obtained either by oxidation of the corresponding carbocyclic compounds or by the fusion of castor oil with alkali (to obtain sebacic acid).

The above-mentioned processes have substantial disadvantages such as the use of expensive or scarcely available raw materials (butanediol, tetrahydrofuran, castor oil) and also a great number of steps required for the process of preparing the desired products.

The object of the present invention is to provide a one-stage process for the preparation of higher dicarboxylic acids ($C_6$ and higher) from more readily available and cheaper raw materials.

Accordingly, a one-stage process for the preparation of higher dicarboxylic acids under relatively mild conditions and using simple equipment has been developed.

The process is carried out at high pressure and temperature. A pressure above 50 atm. is used, the optimum pressure being in the range of 200–1000 atm. Lower pressures are not favorable for the course of the reaction; carrying out the reaction at a higher pressure is possible but is not always economically advantageous. The reaction is carried out at a temperature above 100° C. The optimum temperature is dependent on the structure of the starting diolefin, on the concentration of the reactants and other additives but is generally in the range of 150°–350° C.

Conjugated diolefins such as butadiene, piperylene, isoprene and other alkyl or polyalkylbutadienes as well as non-conjugated diolefins such as 1,5-hexadiene may be used as starting materials. A cyclic napththenic diolefins such as vinylcyclohexene or aromatic diolefins such as divinylbenzene, as well as mixtures of the above-mentioned diolefins or mixtures of diolefins with monoolefins and saturated hydrocarbons also may be used.

In carrying out the process it is advantageous to use solvents such as acetone and dioxane which have good solvency both for water and for the diolefins. When using such a solvent, the reaction mixture does not divide into separate layers which otherwise would cause a sharp deceleration of the reaction resulting from a decrease in concentration of the diolefin in the water layer and of water in the organic layer.

We have found that the reaction proceeds satisfactorily only in the presence of Lewis bases. It is extremely advantageous to carry out the reaction in the presence of pyridine or other basic substances. The above-mentioned compounds may be introduced into the reaction mixture in the form of an additive or used as a solvent.

Metal carbonyls or complex compounds of metal carbonyls with basic substances may be used as catalysts in the process. Cobalt carbonyls and complex compounds of cobalt carbonyls are of particular importance. Cobalt may be introduced into the reactor in the form of any of its compounds which are readily transformed into carbonyl at high temperatures or on reacting with carbon monoxide.

In some cases the dicarboxylic acids are contaminated with cobalt carbonyls during distillation. Therefore it is sometimes advantageous to treat the reaction product with oxygen of the air or other oxidizing agents to convert the volatile, cobalt carbonyl to non-volatile, ionic cobalt.

The examples given below illustrate the invention but do not limit is scope.

EXAMPLE 1

A mixture of 6 grams of butadiene, 20 cc. of water, 4.4 grams of dicobalt octacarbonyl and 200 cc. of pyridine was treated with carbon monoxide at a pressure of 430 atm. and at a temperature of 210° C. for a period of one hour. The acid number of the product was 42. By the use of paper chromatograpyhy, four different acids were detected: adipic acid, α-methylglutaric acid, ethylsuccinic acid and n-valeric acid (produced apparently by the thermal decarboxylation of propylmalonic acid). The total yield of the above-mentioned acids calculated on the butadiene charged amounted to 50–70 percent of the theoretical amount.

The volatile components of the reaction product (including the anhydrides of α-methylglutaric and ethylsuccinic acid) were separated from the adipic acid by vacuum distillation. A solid blue substance which remained in the still was dissolved on boiling with 60% nitric acid; on cooling the obtained red solution, a white substance crystallized out which after recrystallization from ethyl acetate melted at 151–152° C. A determination of the melting point of a mixture of the obtained substance with 100± 0.2% adipic acid showed no depression.

Found, percent; C, 49.76; 49.92; H, 7.04; acid number 763. Calculated for $C_4H_8(COOH)_2$, percent: C, 49.31; H, 6.90; acid number 767.8.

Separation of the mixture of acids obtained by the reaction of butadiene with carbon monoxide and water is easily accomplished. During gradual heating the following operations take place: (a) the distillation of valeric acid, B.P. 186° C.; (b) the dehydration of α-methylglutaric acid and ethylsuccinic acid to their anhydrides; (c) the distillation of ethylsuccinic anhydride, B.P. 243° C.; (d) the distillation of α-methylglutaric anhydride, B.P. 272–275° C. Adipic acid remains in the still and may be purified by crystallization or vacuum distillation. It is also advantageous to carry out operations (c) and (d) under vacuum.

EXAMPLE 2

Experiments were carried out in a manner similar to Example 1, except that the amount of butadiene charged was varied. The results given in the table show that the yield of acids (percent of theory) sharply decreases on increasing the initial concentration of butadiene. The yield of acids was determined by the acid number of the product.

Initial concentration of butadiene percent

| | Acid number of product |
|---|---|
| 3 | 65 |
| 6 | 48 |

EXAMPLE 3

6 grams of butadiene and 4 cc., of water were added to the product obtained according to Example 1; the resulting mixture was treated as described in Example 1. The acid number of the product was 81. 6 grams of butadiene and 4 cc. of water were added again to this product; the resulting mixture was treated as described in Example 1. The acid number of the product was 120. This example illustrates the possibility of obtaining a concentrated solution of acids by the gradual addition of diolefin to the reaction mixture; thus, in spite of the low concentration of diolefin in the reactor it is possible to avoid multiple separation and recirculation of solvent and catalyst.

EXAMPLE 4

An autoclave was charged with 90 cc. of pyridine, 2 grams of dicobalt octacarbonyl, 10 cc. of water, 1 gram of hydroquinone and 5 cc. of technical grade 1,3-pentadiene, the composition of the latter being 55% trans-1,3-pentadiene, 30% cis-1,3-pentadiene, 4% isoprene and 10% pentenes. Carbon monoxide was introduced to a pressure of 250 atm. and the autoclave was agitated to provide mixing for 1 hour at 210° C. The acid number of the product was 38. A paper chromatographic analysis of the product showed $C_7$ dicarboxylic acids.

EXAMPLE 5

An autoclave was charged with 9.5 grams of 1,5-hexadiene, 20 cc. of water, 5 grams of dicobalt octacarbonyl and 180 cc. of pyridine and then carbon monoxide was introduced to a pressure of 300 atm. The reaction mixture was then heated to 210° C. and maintained at this temperature for one hour. Mixing was provided by agitation of the autoclave. The acid number determination of the product showed that the yield of acid was close to 70% of theory. The product was treated with air and distilled. The fraction boiling at 190–225° C. (10 mm. Hg) was twice recrystallized from water.

Found, percent: C, 55.18; 54.91; H, 8.16; 8.28; acid number 643, 648. Calculated for $C_6H_{12}(COOH)_2$ percent: C, 55.16; H, 8.10; acid number 644.8.

The substance which remained in the still was dissolved on boiling in 20% hydrochloric acid. The substance which precipitated on cooling the solution, was recrystallized from water three times.

Found, percent: C, 55.78, 56.10; H, 8.26, 8.41; acid number 639, 640. Calculated for $C_6H_{12}(COOH)_2$, percent: C, 55.16; H, 8.10; acid number 644.8.

Since the melting point of both samples of hexanedicarboxylic acid obtained was close to 140° C. it may be concluded that two or three crystallizations from water make it possible to separate suberic acid, $HOOC(CH_2)_6COOH$, M.P. 140° C., from other $C_8$ dicarboxylic acids which were obtained in the process the latter being more soluble in water.

Although the present invention has been described in accordance with a preferred embodiment, various changes and modifications may be made in carrying out the present invention without departing from the spirit and scope thereof as will be understood by those skilled in the art.

What we claim is:

1. A process for the preparation of dicarboxylic acids said process comprising reacting a mixture including at least one diolefin, carbon monoxide and water in the presence of a cobalt carbonyl and pyridine at a temperature of 150°–350° C. and a pressure of 200–1000 atmospheres, said diolefin, water and cobalt carbonyl being present in respective amounts of 0.3–40%, 4–30% and 0.05–7% by weight to form dicarboxylic acids and separating said acids from the reaction mixture.

2. A process as claimed in claim 1 wherein the diolefin is a conjugated diolefin.

3. A process as claimed in claim 1 wherein the diolefin is a non-conjugated diolefin.

4. A process as claimed in claim 2 wherein the conjugated diolefin is butadiene.

5. A process as claimed in claim 2 wherein the conjugated diolefin is 1,3-pentadiene.

6. A process as claimed in claim 3 wherein the non-conjugated diolefin is 1,5-hexadiene.

7. A process as claimed in claim 1 comprising destroying the cobalt carbonyl by oxidation prior to separation of the dicarboxylic acids.

References Cited

UNITED STATES PATENTS

| | | |
|---|---|---|
| 2,586,341 | 2/1952 | Hyson. |
| 2,448,368 | 8/1948 | Ovesham et al. |
| 2,768,968 | 10/1956 | Reppe et al. |
| 2,911,422 | 11/1959 | Evcoli. |
| 3,161,672 | 12/1964 | Zachry et al. |

FOREIGN PATENTS

| | | |
|---|---|---|
| 1,052,088 | 10/1966 | Great Britain. |

LORRAINE A. WEINBERGER, Primary Examiner

D. STENZEL, Assistant Examiner

UNITED STATES PATENT OFFICE
CERTIFICATE OF CORRECTION

Patent No. 3,481,975  Dated December 2, 1969

Inventor(s) David Moiseevich Rudkovsky et al.

It is certified that error appears in the above-identified patent and that said Letters Patent are hereby corrected as shown below:

Column 1, line 55, "A cyclic" should read -- Acyclic --.
Column 2, line 9, cancel "or".

Signed and sealed this 23rd day of March 1971.

(SEAL)
Attest:

EDWARD M. FLETCHER, JR.
Attesting Officer

WILLIAM E. SCHUYLER, JR
Commissioner of Patents